United States Patent …

(12) United States Patent
Wang et al.

(10) Patent No.: US 7,981,942 B2
(45) Date of Patent: Jul. 19, 2011

(54) POLYETHYLENE MOLDING POWDER AND POROUS ARTICLES MADE THEREFROM

(75) Inventors: Louis Chun Wang, Raritan, NJ (US); Jens Ehlers, Hamminkeln (DE)

(73) Assignee: Ticona LLC, Florence, KY (US)

( * ) Notice: Subject to any disclaimer, the term of this patent is extended or adjusted under 35 U.S.C. 154(b) by 121 days.

(21) Appl. No.: 11/596,741

(22) PCT Filed: Jun. 6, 2005

(86) PCT No.: PCT/US2005/019770
§ 371 (c)(1),
(2), (4) Date: Nov. 16, 2006

(87) PCT Pub. No.: WO2005/121221
PCT Pub. Date: Dec. 22, 2005

(65) Prior Publication Data
US 2007/0225390 A1 Sep. 27, 2007

Related U.S. Application Data

(60) Provisional application No. 60/578,005, filed on Jun. 7, 2004.

(51) Int. Cl.
B29C 44/34 (2006.01)
B29C 67/00 (2006.01)
C08J 9/00 (2006.01)

(52) U.S. Cl. ............................. 521/142; 521/77; 264/125

(58) Field of Classification Search .................. 521/77, 521/142; 264/125
See application file for complete search history.

(56) References Cited

U.S. PATENT DOCUMENTS

| 3,024,208 A | 3/1962 | Goethel et at. ................. 260/2.5 |
| 3,954,927 A | 5/1976 | Duling et al. .................... 264/49 |
| 4,925,880 A * | 5/1990 | Stein ................................ 521/98 |
| 4,962,167 A | 10/1990 | Shiraishi et al. ............... 526/125 |
| 4,972,035 A * | 11/1990 | Suga et al. .................. 526/125.6 |
| 5,300,470 A | 4/1994 | Cuffiani et al. ............... 502/110 |

(Continued)

FOREIGN PATENT DOCUMENTS

| WO | WO 85/04365 | 10/1985 |
| WO | WO 00/18809 | 4/2000 |
| WO | WO 0018810 A2 * | 4/2000 |

OTHER PUBLICATIONS

Sangeeta Hambir and J P Jog, Sintering of Ultra High Molecular Weight Polyethylene, Bull. Mater. Sci., v. 23, No. 3 (Jun. 2000).

Primary Examiner — Mark Eashoo
Assistant Examiner — Liam J Heincer
(74) Attorney, Agent, or Firm — Michael W. Ferrell

(57) ABSTRACT

The present invention relates to a new molding powder comprising polyethylene polymer particles. The molecular weight of the polyethylene polymer is within the range of from about 600,000 g/mol to about 2,700,000 g/mol as determined by ASTM 4020. The average particle size of the particles of the polyethylene polymer is within the range of from about 5 microns to about 1000 microns and the polyethylene has a powder bulk density in the range of from about 0.10 to about 0.30 g/cc. Also disclosed is a process for molding a shape from a molding powder comprising the inventive polyethylene polymer particles, as well as porous articles made in accordance with the process. The articles have excellent porosity and good strength for porous and porous filtration applications.

6 Claims, 3 Drawing Sheets

U.S. PATENT DOCUMENTS

| | | | |
|---|---|---|---|
| 5,587,440 A | 12/1996 | Ehlers et al. | 526/153 |
| 5,683,634 A * | 11/1997 | Fujii et al. | 264/41 |
| 5,977,229 A | 11/1999 | Barth et al. | 524/377 |
| 6,770,736 B1 * | 8/2004 | Haftka et al. | 528/396 |
| 7,049,382 B2 | 5/2006 | Haftka et al. | 526/348 |
| 2002/0040113 A1 | 4/2002 | Fritzsche et al. | 526/129 |
| 2004/0006170 A1 * | 1/2004 | Haftka et al. | 524/515 |
| 2004/0110853 A1 * | 6/2004 | Wang et al. | 521/56 |

* cited by examiner

POLYETHYLENE MOLDING POWDER AND POROUS ARTICLES MADE THEREFROM

PRIORITY CLAIM

This application is based upon U.S. Provisional Application Ser. No. 60/578,005 titled "Polyethylene Resin and Porous Articles Made Therefrom," filed Jun. 7, 2004, the priority of which is hereby claimed.

FIELD OF INVENTION

The invention relates to the field of synthetic polymer materials for molding porous articles. In particular, the invention is directed to a new polyethylene molding resin which can be shaped and sintered to form articles having high porosity.

BACKGROUND

Ultra-high-molecular weight polyethylene (UHMW-PE), standard high-density polyethylene (HDPE) and low-density polyethylene (LDPE) have all been used as polymeric materials for producing different types of molded porous articles. Such articles include filter funnels, immersion filters, filter crucibles, porous sheets, pen tips, marker nibs, aerators, diffusers and light weight molded parts. However, the polyethylene formulations used in these applications are all associated with various disadvantages.

LDPE and standard HDPE, which include polyethylene of molecular weight up to 250,000 g/mol, yield good part strength but their melt behavior results in a narrow processing window with respect to both time and temperature. As result, there is a strong tendency toward reduced porosity and an increased quality inconsistency in the molded product. Furthermore, with LDPE or standard HDPE as the molding powder, the non-uniformity of heating within molds having complex geometric conduits tends to result in non-uniformity in the porosity of the product part.

In contrast to LDPE and standard HDPE, UHMW-PE formulations with an average molecular weight above 2,500,000 g/mol exhibit excellent processing forgiveness. Specifically, it is known in the art that UHMW-PE molding powders are characterized by a wide time and temperature processing window. However, these UHMW-PE formulations are known to result in rather weak molded products. Moreover, regional weak spots tend to be formed when UHMW-PE is used with molds having a complex geometric conduit. To maintain or improve the strength of porous articles made from UHMW-PE, U.S. Pat. No. 4,925,880 to Stein discloses the addition of a polyethylene wax to the UHMW-PE particles. Stein teaches to add the wax in an amount between 5-60% to improve strength and porosity. However, the use of polyethylene wax in this manner restricts the time and temperature processing window and is thus associated with the same disadvantages as using LDPE and standard HDPE.

High molecular weight polyethylenes are valued for properties such as chemical resistance, abrasion resistance, strength, water absorption, energy absorption, heat deflection, and sound-dampening capabilities. Processes for preparing high molecular weight polyethylenes are known in the art. U.S. Pat. No. 4,962,167 to Shiraishi et al. discloses a process for making polyethylene powder by polymerizing ethylene using a solid catalyst component and an organometallic compound. According to the '167 patent the polyethylene powder is reported to have bulk densities from 0.30 g/cc to 0.34 g/cc with particle diameters ranging from 195 to 245 microns.

Another process for making high molecular weight polyethylene is disclosed by U.S. Pat. No. 4,972,035 to Suga et al., whereby polymerization is carried out in the presence of a Ziegler catalyst and the polyethylene is subjected to a high-speed shearing treatment. The morphologies of the particles in Suga et al. are stated to be substantially spherical, with elliptical or cocoon-like shapes.

U.S. Pat. No. 5,587,440 to Ehlers et al. discloses a method for making high molecular weight polyethylene powder with bulk densities ranging from 350 to 460 g/liter using Ziegler type catalysts.

Methods for producing porous articles from high molecular weight polyethylene powders are likewise known. U.S. Pat. No. 3,024,208, to Goethel et al. discloses a process for forming porous bodies by placing the polyethylene powder into containers and heating it under slight pressure. The porous articles produced by the process in Goethel et al. are reported to have densities ranging from 0.33 g/cc to 0.66 g/cc and porosities between 32 and 67%.

Still further processes for making polyethylene articles are noted below.

PCT Application Publication No. WO 85/04365 discloses a sintering process whereby high molecular weight polyethylene powder is pre-compacted under pressure and heat to increase its bulk density. The compacted powders are reported to have bulk densities that are greater than 0.4 g/cc. The bulk density is increased by altering the particles' morphologies (removing the "fine structure") by passing the powder through a pellet or roll mill. The particle morphology of high molecular weight polyethylene can affect the compaction and sintering behavior of the powder. See, Sangeeta Hambir and J P Jog, *Sintering of Ultra High Molecular Weight Polyethylene*, Bull. Mater. Sci., v. 23, No. 3 (June 2000).

U.S. Pat. No. 5,977,229 to Barth et al. and U.S. Pat. No. 3,954,927, discloses porous articles, particularly filters, which are sintered from high molecular weight polyethylene.

Copending U.S. patent application Ser. No. 10/640,830 discloses a process for forming a porous article using a molding powder comprising a polyethylene polymer having a molecular weight in the range of about 800,000 to about 3,500,000 as determined by ASTM-D 4020, and a particle size distribution in the range of about 10 microns to about 1,000 microns. The particles are spherical in shape. Commercial examples of resins which can be successfully used in this process are GUR® 4012 and 4022, produced by Ticona LLC (Florence, Ky.). These materials have a powder bulk density in the range of 0.38 to 0.55 gm/cc. Although GUR® 4012 and 4022 can be shaped and sintered to yield articles having good porosity, there is still a need for improved polyethylene resins for preparation of articles having well-controlled porosity and good mechanical strength.

SUMMARY OF THE INVENTION

According to one aspect of the present invention, a molding powder comprising polyethylene polymer particles is provided. The polyethylene polymer has a molecular weight within the range of about 600,000 g/mol to about 2,700,000 g/mol as determined by ASTM 4020. The polyethylene polymer has an average particle size that is within the range of about 5 microns to about 1000 microns, and the polyethylene has a powder bulk density in the range of about 0.10 to about 0.30 g/cc.

The polyethylene polymer typically has a molecular weight ranging from about 750,000 g/mol to about 2,400,000 g/mol, and is preferably in between about 800,000 and about 1,800,000 g/mol. A particularly preferred range is from about 900,000 to about 1,500,000 g/mol. Generally, the polyethylene has a powder bulk density of from about 0.12 to 0.26 grams per cubic centimeter.

The molding powders of the present invention have especially good strength characteristics. The powder exhibits a characteristic flexural strength (defined hereinafter) of at least about 0.7 MPa (megapascals). Preferably the inventive molding powder exhibits a characteristic flexural strength of at least about 0.9 MPa, or at least about 1.1 MPa.

In some embodiments of the present invention the molding powder comprises a polyethylene with a molecular weight of about 1,000,000 g/mol to about 2,600,000; a particle size of about 5 to about 800 microns; and a powder bulk density ranging from about 0.12 to 0.29 g/cc. Alternatively, the polymer may have a molecular weight that ranges from about 1,000,000 g/mol to about 1,800,000 g/mol and have an average particle size that is between about 10 and 200 microns.

In another aspect of the present invention, there is provided a process for preparing a porous article from the inventive resin powder. The molding powder comprises polyethylene with a molecular weight between about 600,000 and 2,700,000 g/mol; an average particle size ranging from about 5 to about 1000 microns; and a powder bulk density between about 0.10 and 0.30 g/cc. The powder is formed into the desired shape and heated to a temperature of between 140° C. and 300° C. for a sufficient time to permit the polymer to expand and soften. The powder is preferably heated to temperatures of between about 150° C. to about 280° C., and even more preferably to about 170° C. to about 260° C. The porous article is subsequently cooled.

In still another yet another aspect of the present invention there is provided a porous article that is prepared from a polyethylene powder which has a molecular weight of between about 600,000 g/mol to about 2,700,000 g/mol; an average particle size in the range of about 5 microns to about 1,000 microns, and a powder bulk density in the range of about 0.1 to about 0.3 g/cc. Generally, the porous article has an average pore size of between about 5 μm and 100 μm and, even more typically, between about 50 μm and 80 μm. Also, the porous article usually has a porosity of between about 30 to 85 percent; preferably between about 60 and 75 percent.

Further features and advantages of the present invention will become apparent from the discussion that follows.

BRIEF DESCRIPTION OF DRAWINGS

The invention is described in detail below with reference to the various figures wherein like numerals designate similar parts and wherein.

DETAILED DESCRIPTION

Figure 1:
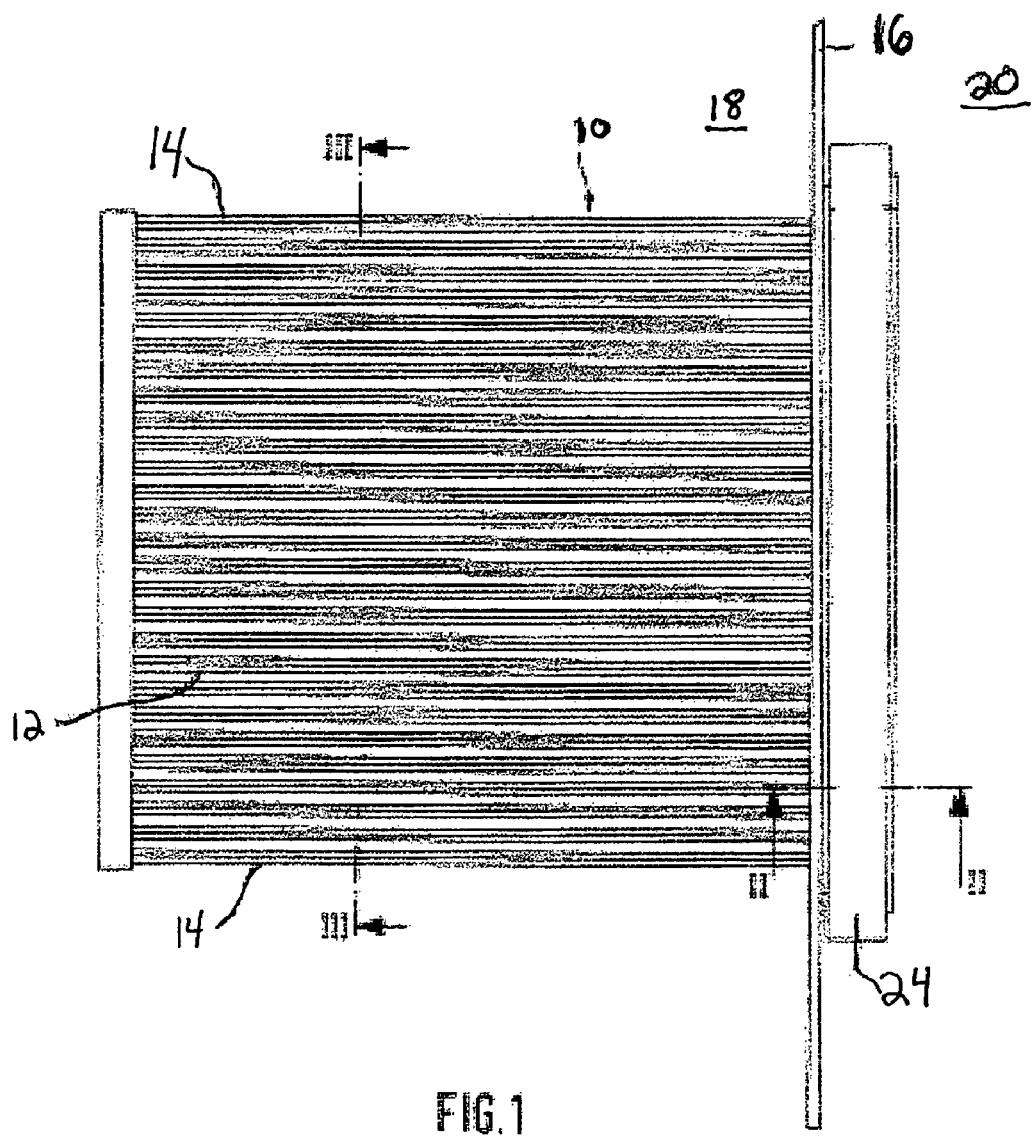
FIG. 1 illustrates a filter element according to the present invention.

The present invention is described in detail below with reference to the various examples and appended Figures. Modifications to particular examples within the spirit and scope of the present invention, set forth in the appended claims, will be readily apparent to those of skill in the art.

Unless otherwise indicated, terms are to be construed in accordance with their ordinary meaning. Following are some exemplary definitions of terms used in this specification and the appended claims.

The present invention provides a new and improved molding powder comprising polyethylene polymer particles. Specifically, the polyethylene polymer has a molecular weight within the range of about 600,000 g/mol to about 2,700,000 g/mol. The particle size distribution of the polyethylene polymer particles is within the range of about 5 microns to about 1000 microns, and the polymer particles have a powder bulk density in the range of about 0.10 to about 0.30 g/cc.

In accordance with more particular embodiments of the invention, the molecular weight of the polyethylene polymer may fall within any of the following molecular weight ranges as determined by ASTM 4020: from about 750,000 g/mol to about 2,400,000 g/mol; and from about 800,000 g/mol to about 1,750,000 g/mol. In further embodiments of the invention, the powder bulk density may be in the range of from about 0.12 to 0.26 g/cc or, preferably, from about 0.18 to about 0.26 g/cc.

The production of high molecular weight polyethylene is typically achieved by the catalytic polymerization of ethylene monomer with a heterogeneous catalyst and Aluminium Alkyl as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature or the Aluminium alkyl (type and concentration) may also be used to fine tune the molecular weight. Additionally, the reaction may occur in the presence of antistatic agents to avoid wall fouling and product contamination.

Preferred catalysts include Ziegler-Natta type catalysts. Ziegler type catalysts are typically halides of transition metals from Groups IV-VIII react with alkyl derivatives of metals or hydrides from Groups I-III. Exemplary Ziegler catalysts include those based on the reaction products of aluminium and magnesium alkyls and titanium tetrahalides. Magnesium Chloride and porous fine grained materials, like silica, may also be used as support. Specifically the reaction product of Titaniumtetrachloride and Isoprenylaluminium is preferred.

The solid catalyst component results as the reaction product of a diluted Ti (IV)-chloride and diluted Isoprenylaluminium. The mole ratio (Ti:Al) is between 1:0.01 and 1:4 at a reaction temperature between −40° C. and 100° C. The feed of titaniumtetrachloride is between 0.5 min and 60 min. An aliphatic solvent is used, which is purified through distillation and mole sieve treatment.

Preferred reaction conditions are a temperature in the range of −20° C. and 50° C., most preferred is the range of 0° C. and 30° C. The concentration of titaniumtetrachloride is in the range of 0.1 and 9.1 mole/l, preferred 0.2 and 5 mole/l. The concentration of aluminiumalkyl is in the range 0.02 and 0.2 mol/l. The titanium component is added to the aluminium component. The dosing time is in the range of 0.1 min and 60 min, preferred 1 min to 30 min. The reaction mixture is cooled or heated to ambient temperature. The amount of Ti (III) is at least 95% after 10 h. The isorenyl is supplied from Crompton; the titaniumtetrachloride from Akzo. The particle morphology is controlled through concentration of reactants, reaction temperature and agitation speed.

The polymerization is carried out in suspension at low pressure and temperature in one or multiple steps, continuous or batch. The polymerization temperature is in the range of 30° C. and 130° C., preferred is the range of 50° C. and 90° C. The ethylene partial pressure is in the range of less than 10 MPa, preferred is the range of 0.05 and 5 MPa. Isoprenyl aluminium is used as cocatalyst. The ratio of Al:Ti is in the range of 1 and 30:1, more preferred is the range of 2:1 and 20:1. The solvent is an inert organic solvent as typically used for Ziegler type polymerizations. Examples are butane, pentane, hexane, cyclohexene, nonane, decane, higher homologous pure or as mixture of these. The polymer molecular mass is controlled through feeding hydrogen. The ratio ethylene partial pressure and hydrogen partial pressure is in the range of 5 to 100, preferred is the range of 10 and 50. The polymer is isolated and dried in a fluidized bed drier under nitrogen. The solvent may be removed through steam distillation in case of using high boiling solvents. Salts of long chain fatty acids may be added as a stabilizer. Typical examples are calcium-magnesium or zink-Stearate.

Optionally, other catalysts such as Phillips catalysts, metallocenes and post metallocenes may be employed. metallocene and postmetallocene catalysts are also well known. Generally a cocatalyst such as alumoxane is also employed. U.S. patent application No. 2002/0040113 to Fritzsche et al., the entirety of which is incorporated herein by reference, discusses several catalyst systems for producing ultra-high molecular weight polyethylene. The selection of particularly active catalysts may enable the fluidized bet process to be made continuous.

As stated, the powders of the present invention preferably have molecular weights between 600,000 g/mol and 2,700,000 g/mol and a relatively low bulk density. The powders have a lower bulk density, in part, due to their unique porous particle morphology. The polyethylene particles of the present invention typically have a characteristic microglobular appearance. The particles have irregular geometries with uneven surface features. The particles also have porous surface features. The porous particle morphology of the polyethylene powder is a significant factor in contributing to the high porosity of the molded articles made according to the present invention. In contrast, many conventional high molecular weight polyethylenes have a relatively spherical particle morphology. Spherical particles typically have an elliptical shape with relatively smooth surface features.

The morphology of the polymer develops as the particle grows. The break-up of the catalyst may determine the final particle morphology. The size of the catalyst particles may also determine the particle size of the polymer. The final polymer particle is typically 10-50 times as large as the original catalyst particle. Factors such as particle size, particle morphology, particle size distribution, and bulk density are significant properties of the powder because they affect the porosity characteristics of articles which are molded from the powder.

U.S. Pat. No. 5,300,470 to Cuffiani et al. discloses catalysts used in the production of high molecular weight polyethylene. Cuffiani notes that the morphology of the polymer particle substantially replicates that of the catalyst particle, i.e., morphologic replica. And, the morphology of the catalyst can be controlled, for example, by precipitating the catalyst components from a liquid phase under particular conditions. (Cuffiani at col. 1, lines 45-60). EP 1124860 to Ehlers et al., noted above, discloses Ziegler type catalysts used in the production of high and ultra high molecular weight polyethylene. The solid catalyst component is the reaction product of titanium tetrachloride and an aluminium alkyl. The catalyst morphology is controlled through dosing rate, reaction temperature, concentration and the ratio of educts.

Additional materials may be added to the molding powder, depending on the desired properties of the molded article. For example, it may be desirable to combine the polyethylene powder with activated carbon for filtering applications. The powder may also contain additives such as lubricants, dyes, pigments, antioxidants, fillers, processing aids, light stabilizers, neutralizers, antiblock, or the like. Preferably, the molding powder consists essentially of polyethylene polymer, such that additional materials do not alter the basic and novel characteristics of the powder, i.e., processing flexibility and being suitable for forming articles with superior porosity and mechanical strength.

According to another aspect of the present invention, a process for forming a porous article is provided. The process involves molding a shape from a molding powder comprising polyethylene polymer particles. The polyethylene polymer typically has a single modal molecular weight distribution. Here again, the molecular weight of the polyethylene polymer is within the range of about 600,000 g/mol to about 2,700,000 g/mol as determined by ASTM. The particle size distribution of the particles of the polyethylene polymer is within the range of about 5 microns to about 1000 microns. The polymer particles have a powder bulk density in the range of about 0.10 to about 0.30 g/cc. Advantageously, the process provides a desirable processing window for producing articles with excellent porosity and strength.

Molded articles may be formed in accordance with the invention by a free sintering process which involves introducing the molding powder comprising the polyethylene polymer particles into either a partially or totally confined space, e.g., a mold, and subjecting the molding powder to heat sufficient to cause the polyethylene particles to soften, expand and contact one another. Suitable processes include compression molding and casting. The mold can be made of steel, aluminum or other metals.

Sintering processes are well-known in the art. The mold is heated to the sintering temperature, which will vary depending upon individual circumstances. In one embodiment, this temperature is in the range of about 100° C. and 300° C. The sintering temperature may also be within the following ranges: 140° C. to 300° C. and 140° C. to 240° C. The mold is typically heated in a convection oven, hydraulic press or infrared heaters. The heating time will vary and depend upon the mass of the mold and the geometry of the molded article. Typical heating time will lie within the range of about 5 to about 300 minutes. In more particular embodiments, the heating time may be in the range of about 25 minutes to about 100 minutes. The mold may also be vibrated to ensure uniform distribution of the powder. As noted in Goethel et al., higher temperatures generally produce molded articles that have higher densities and are harder. Also, the strength of the desired article correlates with the length of heating time. The optimum temperatures and heating times depend on the molecular weight of the polymer.

A molding pressure may be applied, if desired. In cases requiring porosity adjustment, a proportional low pressure can be applied to the powder. Subjecting the particles to pressure causes them to rearrange and deform at contact points until the material is compressed. The molding powders of the present invention, however, are preferably not compacted either before or during the sintering process. Generally, a powder that is compacted will yield articles with lower porosities.

During sintering, the surface of individual polymer particles fuse at their contact points forming a porous structure. The polymer particles coalesce together at the contact points due to the diffusion of polymer chains across the interface of the particles. The interface eventually disappears and mechanical strength at the interface develops. Subsequently, the mold is cooled and the porous article removed. The cooling step may be accomplished by conventional means, for example it may be performed by blowing air past the article or the mold, or contacting the mold with a cold fluid. Upon cooling, the polyethylene typically undergoes a reduction in bulk volume. This is commonly referred to as "shrinkage." A high degree of shrinkage is generally not desirable as it can cause shape distortion in the final product.

Advantageously, parts made in accordance with the process of the invention and with the polyethylene powder of the described molecular weight range have an improved strength and porosity relative to other HMW-PE and UHMW-PE grades. The polyethylene molding powder of the invention provides excellent processing flexibility and low pressure drop, high porosity through much lower porosity reduction than standard HDPE and LDPE. The articles obtained in accordance with the claimed invention have exceptionally high porosity, excellent porosity uniformity, and good strength for porous and porous filtration applications. Other applications include sound-dampening, absorbent wicking, fluidizing sheets or membranes, analytical equipment, venting and aeration. The molding powder of the present invention is particularly suitable for forming sintered air and liquid filters.

Figure 2:
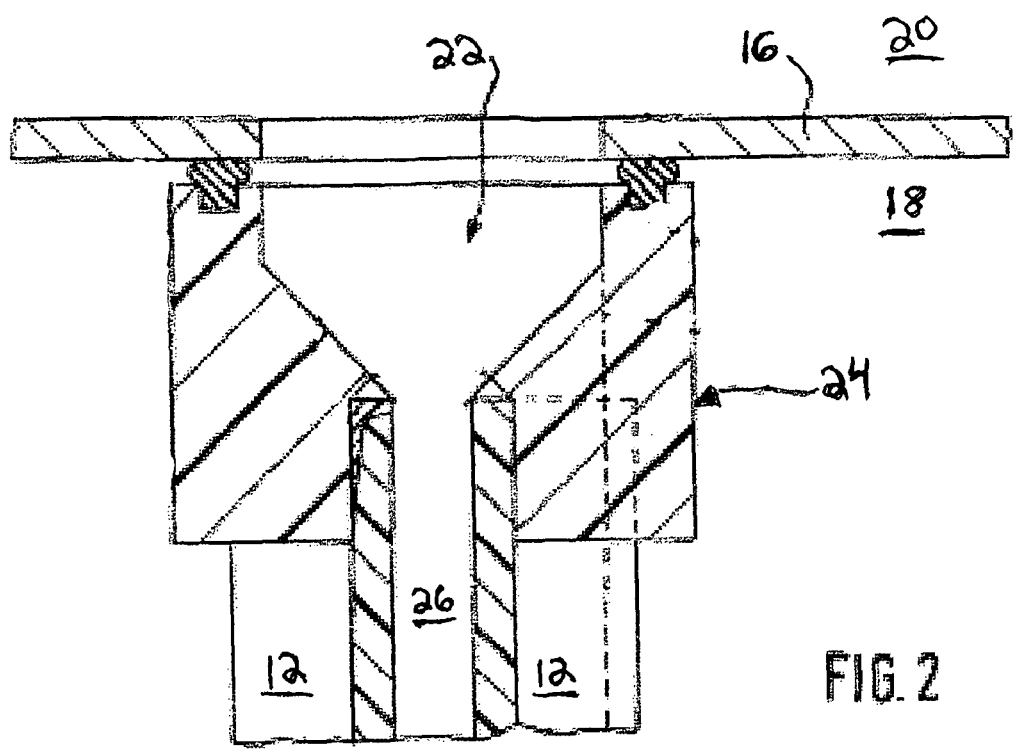
FIG. 2 shows a section through the filter element at the position marked II-II in FIG. 1.
Figure 3:
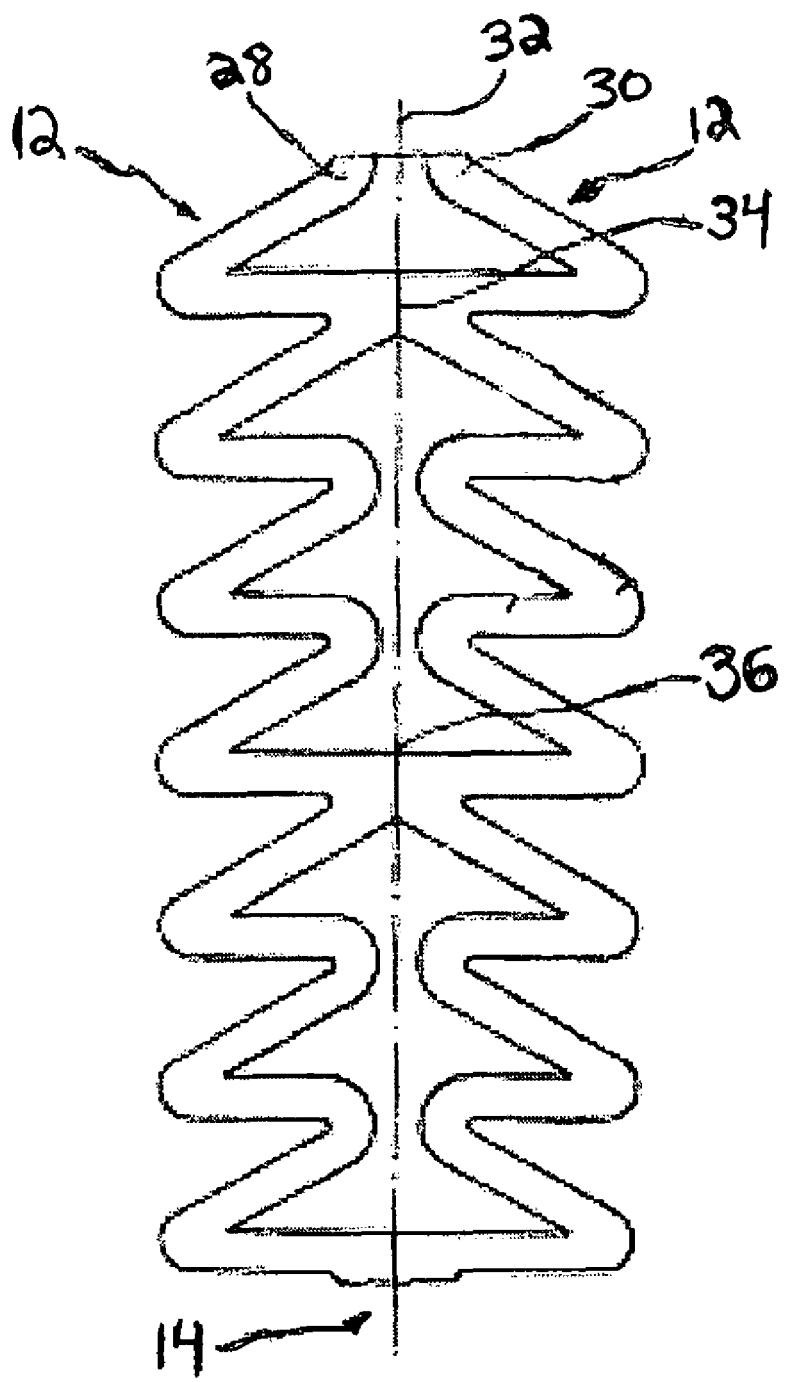
FIG. 3 shows a section through the filter element at the position marked III-III in FIG. 1.

A porous element for a fluid filter made in accordance with the present invention can be seen in FIGS. 1-3. FIG. 1 illustrates a filter element 10 as seen in the viewing direction of a first porous side wall 12. Narrower, second porous side walls 14 laterally join the first side walls 12 to each other so as to form a box like structure. The porous side walls of filter element 10 are sintered from the molding powder of the present invention. A partition 16 separates an unfiltered gas side 18 from a filtered gas side 20. When the filter is operating, the medium to be filtered is sucked through an opening, not shown, and flows from the unfiltered gas side 18 through the porous side walls 12, 14 into the hollow interior of filter element 10. The solid particles to be separated from the medium are retained on the surface of filter element 10 and may be cleaned off periodically. Referring to FIG. 2, the medium is further sucked through a flow passage 22 in head 24 to the clean gas side 20. From there it is discharged through an opening, not shown, to the outside of the apparatus. The space 26 between sidewalls 12, continues in flow passage 22 and extends through head 24 to clean gas side 20. FIG. 3 illustrates two first sidewalls 12 and a narrow, second side wall 14. It can be seen that filter element 10 comprises two halves 28 and 30 coupled along their longitudinal axis 32. The halves are also connected along wall portions 34 and 36, thereby creating individual cells and increasing the strength of the entire filter element 10. Further discussion of sintered filter elements appears in U.S. Pat. No. 6,331,197 to Herding et al., the entirety of which is incorporated herein by reference.

Additional sintered filters can be seen in U.S. Pat. No. 6,770,736 and copending U.S. patent application Ser. No. 10/855,749, which disclose activated carbon filters using high molecular weight polyethylene as a binder. The filter unit is produced by mixing finely divided activated carbon with the polyethylene and molding the powder by thermoplastic sintering.

Procedures

In the following examples, polyethylene molding powder was prepared using a Ziegler-Natta catalyst.

Catalyst Preparation

The catalyst is prepared in a 600 l reactor using 13 mol isoprenylaluminium in 2521 Exxsol D30 (Exxon solvent grade). Titaniumtetrachloride (3000 mol/l) was fed within 180 sec at a starting temperature of 10-15° C. The final Ti:Al ratio was 0.78. The agitation was stopped after 2 h post reaction at 25° C. The upper solvent layer was removed after 15 h. The catalyst solid component was used for polymerization after diluting with 200 l Exxsol D30.

Polymerization

The polymerization was performed in a single step continuous process. Exxsol D30 was used as solvent. The reactor volume was 40 l, the reaction temperature 85° C. at ethylene partial pressure in the range of 0.11 MPa and 0.2 MPa.

Polymer Powder Preparation

The polymer powder was separated from the solvent which was eliminated through a steam distillation. The resulting powder was dried in a fluidized bed under nitrogen. 500 ppm Ca-Stearate was added as an acid scavenger and blended in a Hentschel mixer in order to destroy agglomerates.

Sintered samples were made according to the following procedure:

The porous test samples were prepared by forming porous plaques with a diameter of 140 mm and a thickness of 6.0-6.5 mm in a suitable mold. The mold is filled with the polymer powder and the sides are tapped to settle the powder for uniformity and to improve packing. The top of the mold is leveled, the mold is covered and placed into the convection oven. The sintering temperature and time are reported in the tables for each example and specimen. The mold was then removed from the press and cooled quickly. The sample was removed from the mold and allowed to air cool for 40 minutes.

The characteristic flexural strength of a powder is determined by preparing a 140 mm diameter disk having a thickness of about 6.25 mm by way of the above procedure, sintering the part for about 25 minutes at 220° C., and measuring the flexural strength of the disk in accordance with DIN ISO 178.

The shrinkage (in %) is defined as the diameter of the porous plaque in reference with the diameter of the mold.

The polymer powder and the porous plaques were analyzed for various properties according to the following procedures:

| Property | Method |
|---|---|
| Molecular weight | ASTM D-4020 |
| Average Particle size | Laser Scattering[1] |
| Bulk density | DIN 53 466 |
| Average pore size | DIN ISO 4003 |
| Porosity | DIN 66133[2] |
| Flexural strength | DIN ISO 178[3] |
| Pressure Drop | Internal[4] |

[1]Helos, Sympatec with Rodos SR
[2]Hg-Porosimeter, AutoPore IV Series 9500, Micromeretics
[3]UTS Type 10T Universal Testing Machine (UTS Testsysteme GmbH)
[4]Porous plaque with diameter: 140 mm, thickness: 6.2-6.5 mm; airflow: 7.5 m$^3$/h Properties of the tested powders are summarized in Table 1. Sinter conditions and properties of porous parts are summarized in Tables 2-5.

TABLE 1

| Example | Mw × 10⁶ (g/mol) | Average particle size (μm) | Average pore size (μm) | Porosity (%) | Powder bulk density (g/cc) |
|---|---|---|---|---|---|
| Polymer 1 | 1.3 | 108 | 30 | 69 | 0.22 |
| Comp. A | 3.12 | 125 | 30 | 71 | 0.22 |
| Comp. B | 0.3 | 102 | 28 | 71 | 0.21 |
| Comp. C | 1.10 | 133 | 40 | 49 | 0.45 |

EXAMPLES 1-5

Porous plaques were produced by the free sintering process discussed above from the polyethylene powders of Polymer 1. The polyethylene powder was introduced into a mold, and the mold was heated according to the temperature listed in Table 2, below. The mold was held at the temperature for the time indicated. The shrinkage of the powder is indicated in the table below, as well as results for the porosity of the filter, the strength of the filter, and the pressure drop.

TABLE 2

Molded Part Properties

| Example | Polymer | Mw × 10⁶ (g/mol) | Temp. (° C.) | Sintering time (min) | Shrinkage % | Porosity % | Average pore size (μm) | Flexural Strength (MPa) | Pressure drop (mbar) |
|---|---|---|---|---|---|---|---|---|---|
| 1 | 1 | 1.3 | 220 | 25 | 3.5 | 69 | 58 | 1.27 | 4 |
| 2 | 1 | 1.3 | 220 | 30 | 3.5 | 68 | 54 | 1.15 | 4 |
| 3 | 1 | 1.3 | 220 | 35 | 3.5 | 71 | 63 | 1.13 | 4 |
| 4 | 1 | 1.3 | 240 | 25 | 3.5 | 68 | 69 | 1.14 | 4 |
| 5 | 1 | 1.3 | 260 | 25 | 3.5 | 63 | 69 | 1.10 | 5 |

COMPARATIVE EXAMPLES

Sintered parts were also made from polyethylene powders A, B, and C. These samples represent different powder morphology and molecular weight. These articles were prepared and tested according to the same procedures as in Examples 1-5.

TABLE 3

| Example | Polymer | Mw × 10⁶ (g/mol) | Temp. (° C.) | Sintering time (min) | Shrinkage (%) | Porosity (%) | Average pore size (μm) | Flexural Strength (MPa) | Pressure drop (mbar) |
|---|---|---|---|---|---|---|---|---|---|
| A1 | A | 3.12 | 220 | 25 | 3.5 | 66 | 51 | 0.57 | 5 |
| A2 | A | 3.12 | 220 | 30 | 3.5 | 70 | 53 | 0.63 | 6 |
| A3 | A | 3.12 | 220 | 35 | 3.5 | 66 | 43 | 0.64 | 6 |
| A4 | A | 3.12 | 240 | 25 | 3.2 | 67 | 40 | 0.55 | 4 |
| A5 | A | 3.12 | 260 | 25 | 3.5 | 63 | 38 | 1.10 | 5 |

TABLE 4

| Example | Polymer | Mw × 10⁶ (g/mol) | Temp. (° C.) | Sintering time (min) | Shrinkage (%) | Porosity (%) | Average pore size (μm) | Flexural Strength (MPa) | Pressure drop (mbar) |
|---|---|---|---|---|---|---|---|---|---|
| B1 | B | 0.3 | 150 | 30 | Compacted powder, no mechanical integrity | | | | |
| B2 | B | 0.3 | 150 | 40 | Smooth surface, non sintered powder in the centre | | | | |
| B3 | B | 0.3 | 150 | 45 | 5.3 | n.a. | n.a. | n.a. | 30 |
| B4 | B | 0.3 | 150 | 50 | 5.3 | n.a. | n.a. | n.a. | 250 |
| B5 | B | 0.3 | 150 | 60 | Solid plaque without porosity | | | | |

TABLE 5

| Example | Polymer | Mw × 10⁶ (g/mol) | Temp. (° C.) | Sintering time (min) | Shrinkage (%) | Porosity (%) | Average pore size (μm) | Flexural Strength (MPa) | Pressure drop (mbar) |
|---|---|---|---|---|---|---|---|---|---|
| C1 | C | 1.10 | 220 | 25 | 4.0 | 40 | 38 | 4.7 | 13 |
| C2 | C | 1.10 | 220 | 30 | 4.2 | 43 | 40 | 4.5 | 13 |
| C3 | C | 1.10 | 220 | 35 | 4.3 | 41 | 39 | 4.5 | 14 |
| C4 | C | 1.10 | 240 | 25 | 4.1 | 42 | 40 | 4.5 | 13 |
| C5 | C | 1.10 | 260 | 25 | 4.1 | 43 | 41 | 4.5 | 15 |

As can be seen from comparing Tables 2-5, the polyethylene molding powder of the present invention exhibits excellent porosity characteristics while still maintaining good mechanical strength. Porous articles made from the comparative polymers exhibited lower flexural strength, higher pressure drops and so forth as is appreciated from the data.

ALTERNATIVE EMBODIMENTS

In general, the present invention provides a new and improved molding powder comprising polyethylene polymer particles. Specifically, the polyethylene polymer has a single modal molecular weight distribution, and a molecular weight, broadly, within the range of about 600,000 g/mol to about 3,000,000 g/mol as determined by ASTM. The particle size distribution of the polyethylene polymer particles is within the range of about 5 microns to about 1000 microns, and the polymer particles have a powder bulk density in the range of about 0.10 to about 0.35 g/cc. In cases where the molecular weight exceeds about 2,500,000, the powder exhibits a characteristic flexural strength of at least about 0.7.

According to another aspect of the present invention, a process for forming a porous article is provided. The process involves molding a shape from a molding powder comprising polyethylene polymer particles. The polyethylene polymer has a single modal molecular weight distribution. The molecular weight of the polyethylene polymer is, broadly, within the range of about 600,000 g/mol to about 3,000,000 g/mol as determined by ASTM. The particle size distribution of the particles of the polyethylene polymer is within the range of about 5 microns to about 1000 microns. The polymer particles have a powder bulk density in the range of about 0.10 to about 0.35 g/cc. Advantageously, the process provides a desirable processing window for producing articles with excellent porosity and strength. In cases where the molecular weight exceeds about 2,500,000, the powder exhibits a characteristic flexural strength of at least about 0.7.

In accordance with more particular embodiments of the invention, the molecular weight of the polyethylene polymer may fall within any of the following molecular weight ranges as determined by ASTM: from about 1,000,000 g/mol to about 2,600,000 g/mol; and from about 1,000,000 g/mol to about 1,500,000 g/mol. In further embodiments of the invention, the powder bulk density may be in the range of from about 0.15 to about 0.30 g/cc, or in the range of from about 0.20 to about 0.28 g/cc.

It is understood that the above described embodiments of the invention are illustrative only and that modification throughout may occur to one skilled in the art. Accordingly, this invention is not regarded as limited to the embodiments disclosed herein. In view of the foregoing discussion, relevant knowledge in the art and references discussed above in connection with the Background and Detailed Description, the disclosures of which are all incorporated herein by reference, further description is deemed unnecessary.

What is claimed is:

1. A porous article prepared from a polyethylene powder, wherein the polyethylene powder comprises particles having porous particle morphology and porous surface features, a molecular weight within the range of from about 600,000 g/mol to about 1,800,000 g/mol as determined by ASTM 4020, an average particle size in the range of from about 5 microns to about 1000 microns, and a powder bulk density in the range of from about 0.10 to about 0.30 g/cc and the porous article has a porosity of between about 30% and about 85%, wherein the article has an average pore size of from about 50 μm to about 80 μm.

2. A process for forming a porous article comprising:
(a) providing a molding powder comprising polyethylene polymer particles having porous particle morphology and porous surface features, wherein the polyethylene polymer has a molecular weight within the range of from about 600,000 g/mol to about 1,800,000 g/mol as determined by ASTM 4020; the average particle size of the polyethylene polymer particles is within the range of from about 5 microns to about 1000 microns and the polymer particles have a powder bulk density in the range of from about 0.10 to about 0.30 g/cc;
(b) forming the molding powder into a desired shape;
(c) heating the shape to a temperature of 140° C. to 300° C. for a period of time sufficient to permit the polyethylene polymer to expand and soften, while maintaining a porosity of at least about 30% and optionally maintaining the shape under pressure; and
(d) thereafter cooling and recovering the porous article having a porosity of between about 30% and about 85%.

3. The process according to claim 2, where the temperature is in the range of from about 150° C. and about 280° C.

4. The process according to claim 2, where the temperature is in the range of from about 170° C. and about 260° C.

5. A process for forming a porous article comprising:
(a) providing a molding powder comprising polyethylene polymer particles having porous particle morphology and porous surface features, wherein the polyethylene polymer has a molecular weight within the range of from about 600,000 g/mol to about 1,800,000 g/mol as determined by ASTM 4020; the average particle size of the polyethylene polymer particles is within the range of from about 5 microns to about 1000 microns; and the polymer particles have a powder bulk density in the range of from about 0.10 to about 0.30 g/cc;
(b) forming the molding powder into a desired shape;
(c) heating the shape to a temperature of 140° C. to 300° C. for a period of time sufficient to permit the polyethylene polymer to expand and soften, while maintaining a porosity of at least about 30% and optionally maintaining the shape under pressure; and
(d) thereafter cooling and recovering the porous article having a porosity of from about 30% to about 85%.

6. A process for forming a porous article comprising:
(a) providing a molding powder comprising polyethylene polymer particles wherein the polyethylene polymer has a molecular weight within the range of from about 600,000 g/mol to about 1,800,000 g/mol as determined by ASTM 4020; the average particle size of the polyethylene polymer particles is within the range of from about 5 microns to about 1000 microns; and the polymer particles have a powder bulk density in the range of from about 0.10 to about 0.30 g/cc, and wherein the particles have porous surface features and porous powder morphology and the powder exhibits a characteristic flexural strength of at least about 0.7 MPa;
(b) forming the molding powder into a desired shape;
(c) heating the shape to a temperature of 140° C. to 300° C. for a period of time sufficient to permit the polyethylene polymer to expand and soften, while maintaining a porosity of at least about 30%, and optionally maintaining the shape under pressure; and
(d) thereafter cooling and recovering the porous article having a porosity of between about 30% and about 85%, wherein the article has an average pore size of from about 50 μm to about 80 μm.

* * * * *